United States Patent Office 2,766,239
Patented Oct. 9, 1956

2,766,239

OPTICAL BRIGHTENING AGENTS OF THE STILBENE SERIES

Fritz Fleck, Basel, Switzerland, assignor to Sandoz A. G., Basel, Switzerland, a Swiss firm No Drawing. Application September 3, 1954, Serial No. 454,235

Claims priority, application Switzerland September 16, 1953

2 Claims. (Cl. 260—249.6)

The present invention relates to optical brightening agents of the stilbene series.

According to the present invention valuable optical brightening agents are obtained when cyanuric chloride or cyanuric bromide is reacted in any desired order of succession with (a) 4,4'-diaminostilbene-2-2'-disulfonic acid or a salt thereof, (b) 1-amino-2-propanol, and (c) ammonia and/or a primary aromatic amine in such quantities as primarily to produce a compound of the formula

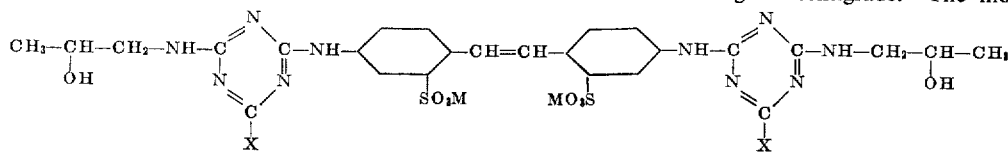

wherein M represents a cation and X represents —NH₂ or the radical of a primary aromatic amine.

It is preferred to start from two mols of cyanuric chloride or two mols of cyanuric bromide, one mol of 4,4'-diaminostilbene-2,2'-disulfonic acid, or a salt thereof, two mols of 1-amino-2-propanol and two mols of an aromatic amine, such as aniline, toluidine, amidine, etc., or of a sulfonic acid of such aromatic amine. The aromatic amine may be replaced, wholly or in part, by ammonia. It is advantageous to suspend the cyanuric chloride or the similarly reacting cyanuric bromide in water with the aid of an organic solvent such as acetone, and to carry out the reaction with the first amine at a temperature between 0 and 20° C., preferably between 0 and 5° C., then with the second amine at a temperature between 20 and 50° C., and finally with the third amine at a temperature between 70 and 100° C., neutralizing the liberated hydrochloric acid by means of an alkali metal hydroxide, carbonate or acetate or even with an excess of the starting amine or ammonia. In the event that the amine or the ammonia are employed in the form of their salts, it is advisable to use an increased quantity of alkali metal hydroxide or other acid-binding agent in order to maintain the desired pH.

The so-obtained brightening agents possess particularly good affinity for vegetable fibers such as cotton, linen, regenerated cellulose, cellulose, paper, etc., as well as for animal fibers such as wool, etc., and for synthetic fibers, for example, polyamide fibers such as nylon, etc.

The brightening effect produced on the various substrata is, particularly when use is made of derivatives wherein X represents the radical of an aromatic amine, of good stability to subsequent treatment in cold Javelle water. The brightening agents of the invention are readily soluble and have a strong optical brightening action, imparting a bluish fluorescence to substrata treated therewith. The treatment of the materials to be optically brightened can take place in a wide variety of ways such e. g. as in a preparation process, a purification process or a washing process or the like. For instance, in the treatment of viscose artificial silk, it may take place by addition of the brightening agent to the spinning mass; in the treatment of material such as cellulose fibers, it may be carried out by addition of the brightening agent to the washing or rinsing bath; in the case of paper it may be carried out in the mixing operation in the hollander or by spraying onto the finished paper web, etc. Wetting agents, detergents or dispersing agents may be added to the new brighteners, or the latter may be used in baths which contain surface-active compounds.

The following examples set forth representative embodiments of the invention which, however, is not intended to be restricted thereto. In the examples, the parts and percentages are by weight, the temperatures are in degrees centigrade. The monoisopropanolamine employed in the examples is technical 1-amino-2-propanol, which can be prepared from propylene oxide and ammonia.

Example 1

A solution of 194 parts of cyanuric chloride in 1000 parts of acetone is run into 2000 parts of ice water, stirring thoroughly. To the resultant fine suspension of cyanuric chloride there is run in the course of 30 minutes at 0–5° a solution of 207 parts of sodium-4,4'-diaminostilbene-2,2'-disulfonate in 1500 parts of water. Then 530 parts of a 10% aqueous sodium carbonate solution are added in the course of 30 minutes, at the end of which time free amino groups should no longer be detectable in a test specimen. The resultant sodium-4,4'-bis-(2,4-dichloro-1,3,5-triazyl-(6)-amino)-stilbene - 2,2' - disulfonate precipitates in a fine state of sub-division.

A solution of 164 parts of m-chloraniline-hydrochloride in 500 parts of water is then added in the course of 10 minutes at 5–10°, after which the mixture is heated to 40°, at which temperature 1060 parts of a 10% aqueous sodium carbonate solution are stirred in, in the course of 2 and ½ hours. 83 parts of monoisopropanolamine dissolved in 250 parts of water are then added. The temperature is raised to 90–95°, whereupon the acetone distils off. Then, in the course of 3 hours, 530 parts of a 10% solium carbonate solution are stirred in, the reaction mixture is diluted with 8000 parts of water, filtered hot, and sodium-bis-(2-m-chloranilino-4-monoisopropanolamine-1,3,5-triazyl-(6)-amino) - stilbene - 2,2' - disulfonate of the formula

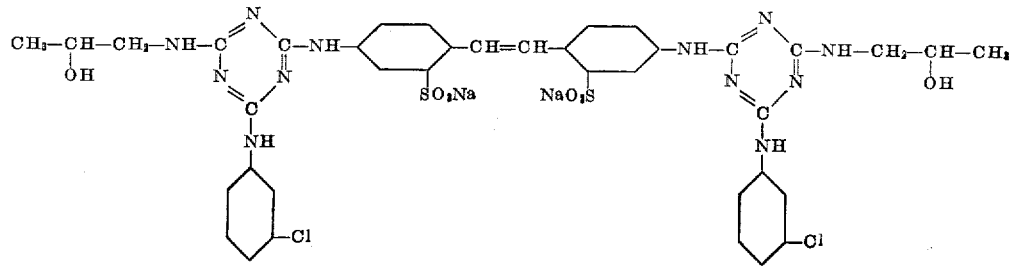

separated from the filtrate by salting out with 1400 parts of sodium chloride, filtered off, washed with sodium chloride solution and dried at 60°. The product is a light yellow, solid, pulverizable substance.

Example 2

A solution of 194 parts of cyanuric chloride in 1200 parts of acetone is run, in the course of 30 minutes at 0–4° C. and while stirring vigorously, into a solution of 207 parts of sodium-4,4'-diaminostilbene-2,2'-disulfonate. Then 400 parts of a 10% solution of aqueous caustic soda are added slowly and, after all free amino groups have disappeared, there is rapidly added a solution of 173 parts of metanilic acid in 500 parts of water, which solution has been neutralized to a pH of 7 by means of 55 parts of calcined sodium carbonate; the mixture is then stirred at 40° for 2 hours. During this stirring, 53 parts of calcined sodium carbonate dissolved in 500 parts of water are added. Then a solution of 83 parts of monoisopropanolamine in 250 parts of water is added, the mixture heated for 3 hours to 90–95°, whereupon acetone distils off, and the pH value maintained at between 7 and 8 by the addition of 400 parts of 10% aqueous caustic soda solution. A clear solution thus results. The latter is filtered and the filtrate is evaporated to dryness under reduced pressure. The resultant sodium-4,4'-bis-(2-m-sulfoanilino-4-monoisopropanolamino-1,3,5-triazyl - (6) - amino)-stilbene-2,2'-disulfonate of the formula

Example 3

The process according to Example 2 is repeated except that the metanilic acid is replaced by the same amount of sulfanilic acid, and there is thus obtained the sodium-4,4' - bis - (2-p-sulfo-anilino - 4 - monoisopropanolamino-1,3,5 - triazyl -(6)- amino)-stilbene-2,2'-disulfonate of the formula

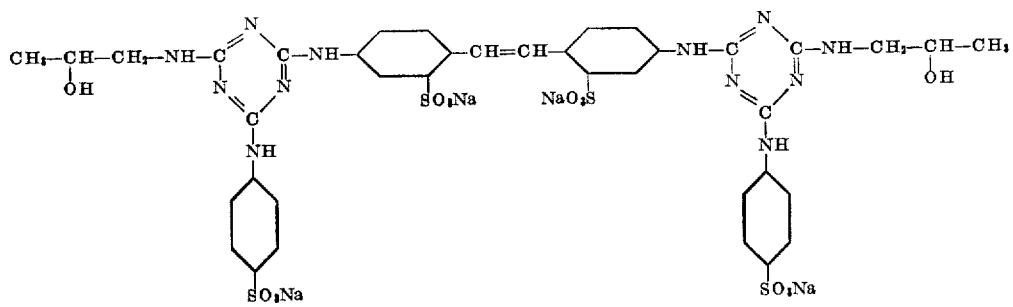

as a sodium chloride-containing, light yellow powder of good solubility in water.

Example 4

A solution of 203 parts of o-anisidine-4-sulfonic acid and 53 parts of calcined sodium carbonate in 500 parts of water is added in the course of 30 minutes and at a temperature of 5–10° to the suspension, prepared according to Example 1, of 412 parts of sodium-bis-(2,4-dichloro-1,3,5-triazylamino)-stilbene-2,2'-disulfonate. The mixture is stirred for 3 hours at 40°, while gradually adding 800 parts of a 10% aqueous solution of caustic soda until all free amino groups have disappeared. 83 parts of monoisopropanolamine are then added, and stirring is continued for 3 more hours at 90–95°. The acetone distils off and the mixture becomes clear. 400 parts of a 10% aqueous caustic soda solution are then added in the course of 3 hours. The solution is filtered and evaporated to dryness under reduced pressure. The obtained sodium-bis-[2 - (2'-methoxy-5'-sulfo) - anilino-4 - monoisopropanol-

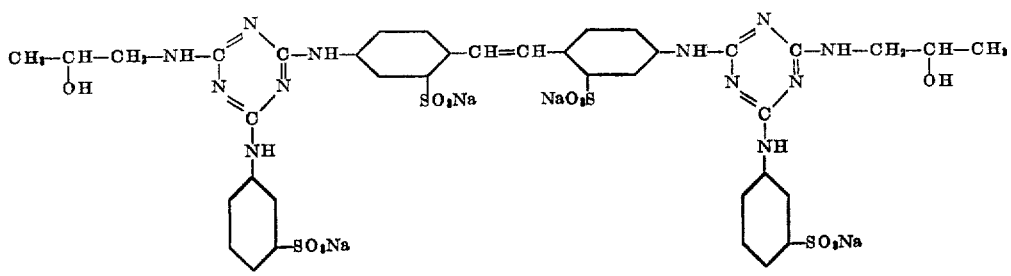

is obtained as a sodium chloride-containing, light yellow powder of very good solubility in water.

amino-1,3,5-triazyl-(6)-amino] - stilbene-2,2'-disulfonate of the formula

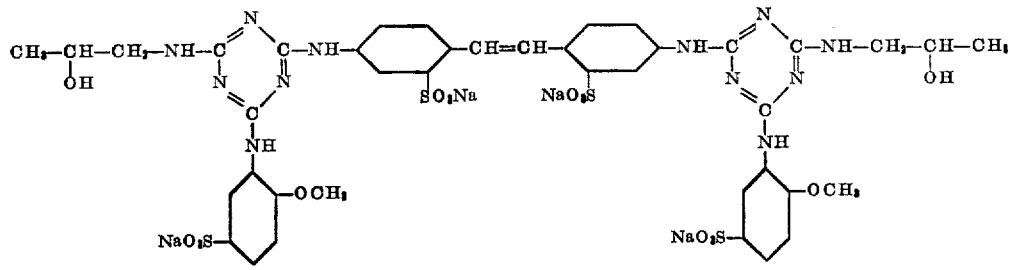

is a light yellow powder of good solubility in water.

The 203 parts of o-anisidine-4-sulfonic acid can be replaced by 303 parts of 2-naphthylamine-6-8-disulfonic acid, whereupon the product will correspond to the formula 1,3,5-triazyl-(6)-amino]-stilbene-2,2'-disulfonate of the formula

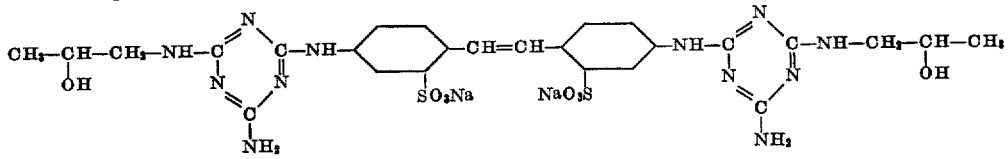

is obtained in the form of a light yellow product of good solubility in water and good fastness to light.

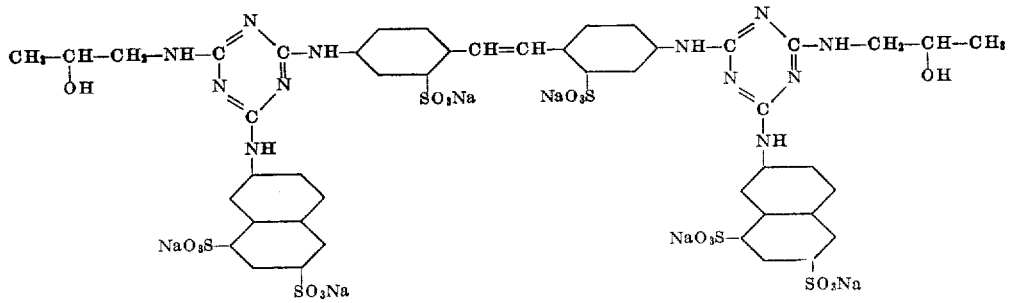

Example 5

To a suspension of 412 parts of sodium-bis-(2,4-dichloro-1,3,5-triazyl-(6)-amino) - stilbene-2,2'-disulfonate, prepared according to Example 1, there are added 75 parts of monoisopropanolamine, the mixture stirred for 2 and ½ hours at 40° while adding 530 parts of a 10% aqueous sodium carbonate solution. There is then added a solution of 142 parts of aniline hydrochloride in 200 parts of water, and the mixture stirred for 3 hours at 90° while gradually adding 800 parts of a 10% aqueous caustic soda solution. After diluting the mass with 3000 parts of hot water, it is filtered and the sodium-bis-[2-anilino-4-monoisopropanolamino - 1,3,5 - triazyl-(6)-amino]-stilbene-2,2'-disulfonate of the formula

Example 7

The process according to Example 5 is repeated, except that 175 parts of o-anisidine hydrochloride are used instead of 142 parts of aniline hydrochloride. A brightening agent similar to that of Example 5 and corresponding to the formula

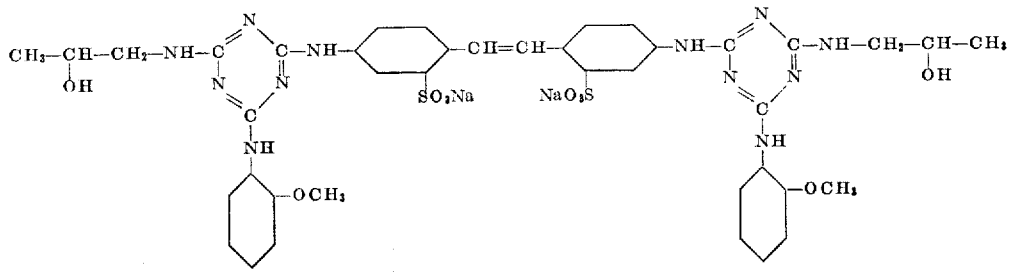

is obtained.

Example 8

75 parts of monoisopropanolamine are added in the course of 30 minutes and at 0–5° to a suspension of 412 parts of sodium-bis-[2,4 - dichloro - 1,3,5 - triazyl - (6) - amino]-stilbene-2,2'-disulfonate in 200 parts of water. Then, again in the course of 30 minutes, 400 parts of a 10% aqueous caustic soda are added. Thereupon a solu-

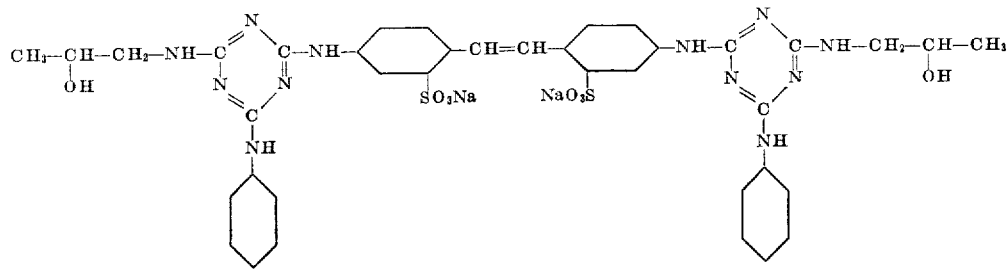

is precipitated by salting out with 150 parts of sodium chloride, after which it is filtered off and dried. It is a light yellow powder.

Example 6

If while otherwise proceeding according to Example 5, the 142 parts of aniline hydrochloride are replaced by 250 parts of an approximately 20% aqueous ammonia solution, sodium - bis-[2-monoisopropanolamino - 4 - aminotion of 207 parts of sodium-4,4'-diaminostilbene-2,2'-disulfonate in 1500 parts of water is rapidly stirred in. Stirring is continued at 40°, with gradual addition of 400 parts of 10% aqueous caustic soda, until primary amino groups can no longer be detected. Finally, a solution of 142 parts of aniline hydrochloride in 500 parts of water is added and the mixture is heated for 3 hours at 90–95°, while gradually adding 800 parts of a 10% aqueous caustic soda solution.

Example 9

Bleached cotton is treated for 20–30 minutes at 35–40° in a bath containing per litre 5 mg. of the compound prepared according to Example 6 and 12.5 g. of sodium sulfate, the bath ratio being 1:40. The cotton is centrifuged without having been rinsed and then dried in the usual manner.

The cotton treated in such a bath appears much whiter than the untreated one.

While the foregoing examples related to the sodium disulfonates, since these are the preferred derivatives, it is also within the scope of the invention to replace the Na cations by other cations such as potassium, lithium, volatile nitrogen containing bases, especially tertiary amines. Thus, instead of starting with the sodium salt in the various illustrative examples, this may be replaced for instance with the corresponding potassium or other appropriate salt, whereby the final product will comprise the corresponding cation.

Having thus disclosed the invention what is claimed is:
1. A compound of the formula

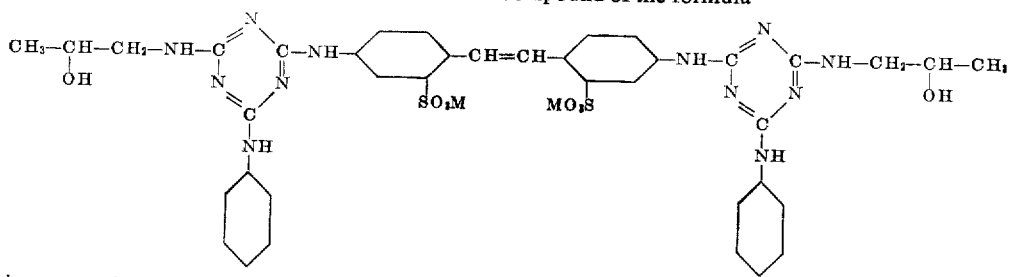

wherein M is a cation including hydrogen.
2. A compound of the formula

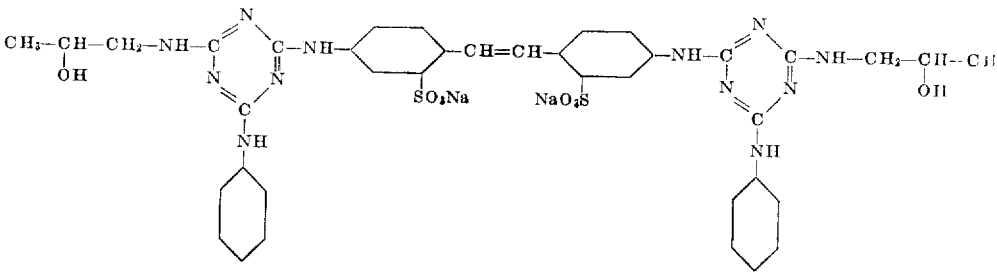

References Cited in the file of this patent

UNITED STATES PATENTS

| | | |
|---|---|---|
| 2,667,458 | Williams | Jan. 26, 1954 |
| 2,671,784 | Williams | Nov. 9, 1954 |

FOREIGN PATENTS

| | | |
|---|---|---|
| 624,052 | Great Britain | May 26, 1949 |
| 704,974 | Great Britain | Mar. 3, 1954 |
| 1,058,686 | France | Mar. 18, 1954 |

UNITED STATES PATENT OFFICE
CERTIFICATE OF CORRECTION

Patent No. 2,766,239                              October 9, 1956

Fritz Fleck

It is hereby certified that error appears in the above numbered patent requiring correction and that the said Letters Patent should read as corrected below.

Columns 7 and 8, extreme right-hand portion of the formula of claim 2 should appear as shown below instead of as in the patent:

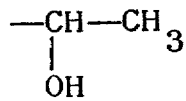

Signed and sealed this 10th day of October 1961.

(SEAL)
Attest:

ERNEST W. SWIDER
Attesting Officer

DAVID L. LADD
Commissioner of Patents
USCOMM-DC